United States Patent [19]
Chen

[11] Patent Number: 5,596,562
[45] Date of Patent: Jan. 21, 1997

[54] CONTROLLING METHOD AND APPARATUS FOR SUPPORTING HARD DISK AND/OR CD-ROM DRIVES THROUGH THE PCMCIA INTERFACE

[75] Inventor: Chih-Hsien Chen, Hsinchu Hsien, Taiwan

[73] Assignee: United Microelectronics Corp., Hsinchu, Taiwan

[21] Appl. No.: 374,880

[22] Filed: Jan. 19, 1995

[51] Int. Cl.$^6$ ......................................... G11B 7/00
[52] U.S. Cl. ..................... 369/124; 369/102; 395/439; 395/800; 395/828; 364/236.2; 365/185.09
[58] Field of Search .................. 369/124, 99, 102; 395/439, 496, 800, 828; 364/236.2, 239, 243, 244.6; 365/185.09, 185.22

[56] References Cited

U.S. PATENT DOCUMENTS

| | | | |
|---|---|---|---|
| 4,665,501 | 5/1987 | Saldin et al. | 395/828 |
| 5,359,570 | 10/1994 | Hsu et al. | 365/185.09 |
| 5,432,748 | 7/1995 | Hsu et al. | 365/185.09 |
| 5,465,343 | 11/1995 | Henson et al. | 395/439 |
| 5,491,827 | 2/1996 | Holtey | 395/800 |

FOREIGN PATENT DOCUMENTS

| | | |
|---|---|---|
| 0456410 | 5/1991 | European Pat. Off. . |
| 35645 | 12/1993 | United Kingdom . |
| 9427224 | 11/1994 | WIPO . |

*Primary Examiner*—Loha Ben
*Attorney, Agent, or Firm*—Ladas & Parry

[57] ABSTRACT

An apparatus for controlling to support hard disk and/or CD-ROM drives through the PCMCIA interface of a notebook computer system. The apparatus comprises a PCMCIA controller connected to the ISA bus of said computer system for implementing PCMCIA interface functions, and an ATA controller also connected to the ISA bus for implementing ATA interface functions. The apparatus further comprises a multiplexer circuit connected both to the PCMCIA controller and the ATA controller for the apparatus to perform either the PCMCIA or the ATA interface functions under control of a selection signal.

13 Claims, 5 Drawing Sheets

CONTROLLING METHOD AND APPARATUS FOR SUPPORTING HARD DISK AND/OR CD-ROM DRIVES THROUGH THE PCMCIA INTERFACE

BACKGROUND OF THE INVENTION

1. Field of the Invention

The present invention relates in general to a control method and apparatus for supporting hard disk and CD-ROM drives through a Personal Computer Memory Card International Association (PCMCIA) interface in a computer system.

2. Technical Background

Hard disk drives, as well as CD-ROM drives, are widely used as storage devices for programs and data in personal computer systems. The reduction in the cost of these mass-storage devices, together with the wide-spread use of a variety of software programs that require ever and ever larger storage space, has turned these storage devices into personal computer standard equipment. In particular, the widely accepted CD-ROM drive not only has become standard in a large portion of desktop systems now being shipped, but also demonstrated the necessity that portable personal computer systems be equipped with the ability to interface to the CD-ROM drives.

A typical interface for the hard disk and CD-ROM drives in the popular personal computer system, specifically, the interface for these drives in the IBM-compatible computer systems, desktop and portable systems inclusive, is the so-called ATA, Advanced Technology Attachment interface. A normal ATA interface supports up to four hard disk and/or CD-ROM drives, provided the drives comply with the specification of that interface. The ATA interface has a 40-pin connector, connecting the hard disk and/or CD-ROM drive devices to the interface electronics circuitry that is normally built into the computer system. In the case of desktop computer systems, the ATA interface is typically implemented in an interface adapter card that resides in a slot on the expansion bus of the computer system, either Industry Standard Architecture (ISA) Video Electronics Standards Association (VESA) or Peripheral Component Interconnect (PCI) bus.

A user upgrading a desktop computer by adding an additional hard disk and/or a CD-ROM drive can perform the upgrade without too much difficulty. On the other hand, however, upgrading a portable computer system, and in particular, the ever popular notebook class of computer, is much more difficult, if not impossible, to upgrade. Most of these computers have severe limitations on the internal adoption of an additional hard disk and/or a CD-ROM drive, due to the obvious restriction of free space inside such computers. Typical notebook computers have one internal hard disk drive, which employs a small diameter platter for its storage disk (typically in the range of 2.5 to 3.5-inch size factors). However, the popular CD-ROM drive devices has a disk diameter of 12 cm, which makes it too bulky to be built into most notebook computers, although not impossible.

To solve the problem of interfacing a notebook computer to an additional hard disk and/or to a CD-ROM drive, a connector for the ATA or, ISA bus of the notebook computer can be provided for the computer to be interfaced to the external hard disk and/or CD-ROM drives that comply with the ATA standard. However, there is no standard mechanical specification for the ISA bus for notebook computers that all CD-ROM drive manufacturers can readily adopt. The result of this lack of standardized ISA bus mechanical specification for notebook computers is the emergence of proprietary docking stations that provide for the hard disk and/or CD-ROM drive expansion capability for notebook computers. However, these proprietary interfacing connections limit the numbers of sources which consumers have for the selection of an expansion hard disk and/or a CD-ROM drive, and, as a result, such expansion devices for the notebook class of computer systems are unnecessarily expensive.

There is one expansion interface standard for notebook class computers that is widely accepted by notebook computer manufacturers. This is the PCMCIA (Personal computer Memory Card International Association) interface. As the name implies, the PCMCIA interface was originally proposed for the expansion of memory storage for small pocket/portable computers.

To utilize this standardized PCMCIA electronic interface, which is found on almost every notebook computer now being manufactured, as an expansion interface for a hard disk and/or a CD-ROM drive for notebook computers, an electronic conversion device was proposed and built for the conversion between the ATA and the PCMCIA buses. FIG. 1 depicts such an implementation.

As is shown in FIG. 1, the conventional scheme of providing a conversion between the ATA interface 30 and the PCMCIA interface 10 requires building a PCMCIA/ATA conversion integrated circuit electronic device 20 that actually performs the conversion for the electronic signals between the two interface standards.

This conversion IC device 20 can be implemented in one single IC chip, so that it can be fitted within the small dimension of a PCMCIA card that can be inserted in a PCMCIA slot of a notebook computer. The added hard disk and/or CD-ROM device can be attached to the ATA connector of the device 20, allowing the hard disk and/or CD-ROM drives to be physically hooked up to the notebook computer externally.

However, this scheme of interfacing the hard disk and/or CD-ROM drive to a computer system has several drawbacks. First of all, conversion device 20 represents an added cost for the disk expansion device. Second, since the expansion drives, either a hard disk or a CD-ROM, appear to the computer system as PCMCIA devices, special software driver routines are required for such drive expansion. Thus, using a hard disk and/or a CD-ROM drive in an IBM-compatible computer system as a PCMCIA device presents additional software compatibility problems.

SUMMARY OF THE INVENTION

It is therefore an object of the present invention to provide method of controlling and an apparatus for supporting a hard disk and/or a CD-ROM drive(s) through a PCMCIA interface, whereby drives of the ATA standard make be directly connected to the computer system via the PCMCIA bus connector.

It is another object of the present invention to provide a controlling method and apparatus, for supporting hard disk and/or CD-ROM drives through the PCMCIA interface, that avoids the software compatibility problem of the PCMCIA interface.

The present invention achieves the above indicated objects by providing a PCMCIA/ATA dual interface apparatus which has interface electronics for both PCMCIA and ATA standards and which can be controlled to function as one selected interface, either PCMCIA or ATA. When set to the PCMCIA, the dual interface apparatus of the present invention functions as a regular PCMCIA interface, accepting the connection of normal PCMCIA devices. When set to ATA the dual interface apparatus functions as a regular ATA accepting the connection of normal ATA devices, such as an ATA hard disk and/or a CD-ROM drive.

BRIEF DESCRIPTION OF THE DRAWING

Other objects, features and advantages of the present invention will become apparent by way of the following detailed description of the preferred but non-limiting embodiment. The description is made with reference to the accompanied drawings, wherein.

DETAILED DESCRIPTION OF THE PREFERRED EMBODIMENT

Figure 1:
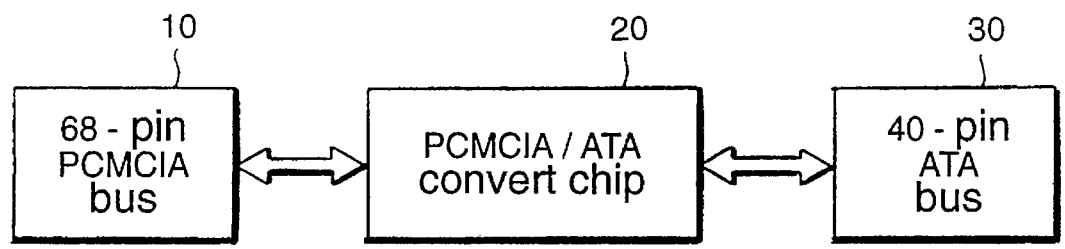
FIG. 1 is a schematic block diagram showing a prior art interfacing scheme that interfaces between the PCMCIA and the ATA interfaces.
Figure 2:
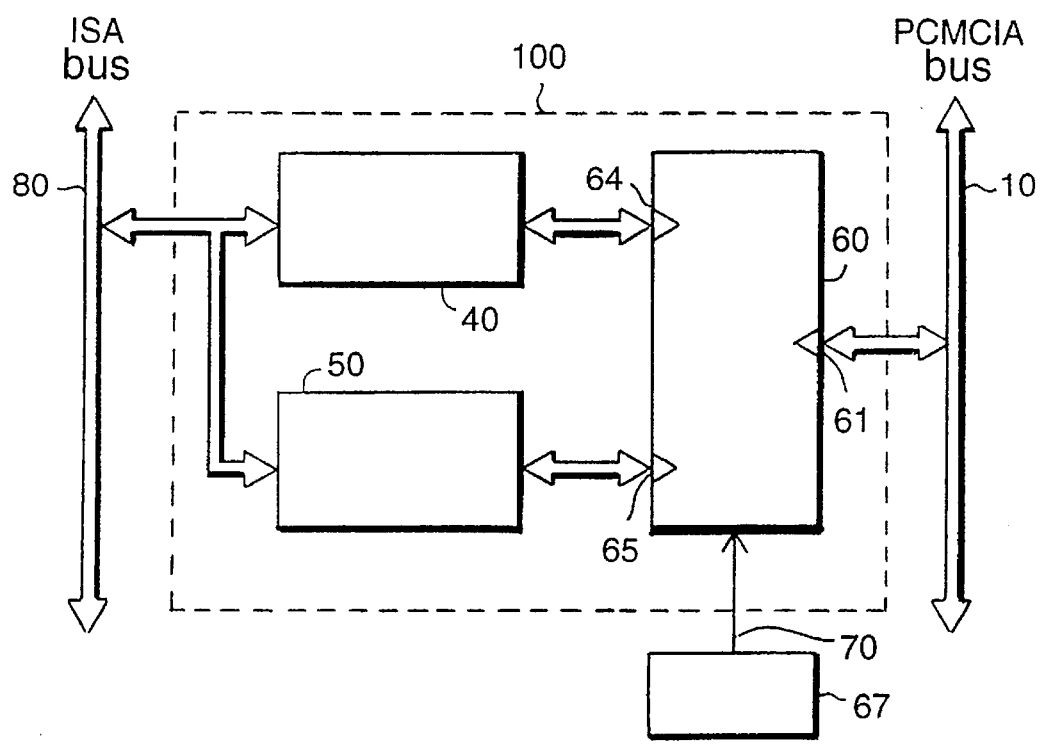
FIG. 2 is a schematic block diagram showing a preferred embodiment of the control apparatus of the present invention that interfaces between the PCMCIA and the ISA buses.

Referring to FIG. 2 of the drawing, a schematic block diagram is depicted which shows a preferred embodiment of the control apparatus of the present invention which interfaces between PCMCIA and ISA buses. A PCMCIA/ATA dual interface apparatus 100 interconnects the PCMCIA bus and the ISA bus of a computer system. An exemplary application of the present invention is in a notebook computer where PCMCIA/ATA dual interface apparatus 100 can be electronically located between the ISA set of electrical signals on ISA bus 80 and PCMCIA bus or feature connector 10.

The dual interface apparatus 100 comprises a PCMCIA controller 40, an ATA controller 50, and a multiplexer 60. The PCMCIA controller 40 and the ATA controller 50 are both tied to the ISA bus of the system, for implementing the functions of the PCMCIA and the ATA interfaces respectively. The two controllers 40 and 50 are each connected to a respective port 64, 65 of multiplexer 60, which, under a selecting strobe generated by a selection circuit 67, can be set so that either the PCMCIA interface (via port 64) or the ATA interface (via port 65) is connected at its multiplexed port 61 to PCMCIA bus 10.

Figure 3A:
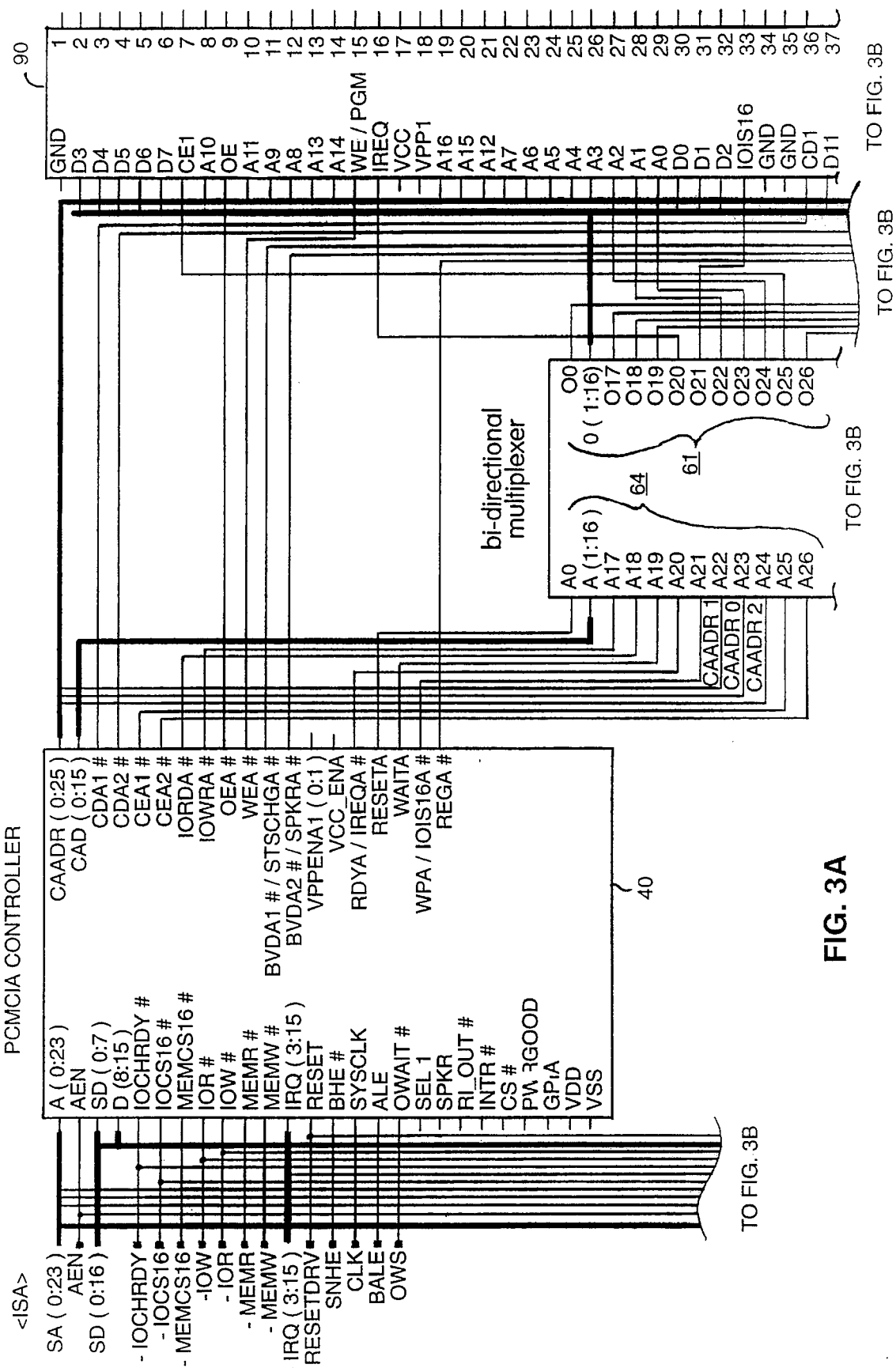
FIGS. 3A and 3B show schematic diagrams of a preferred embodiment of the controlling apparatus of the present invention that interfaces between the PCMCIA and the ISA buses.
Figure 3B:
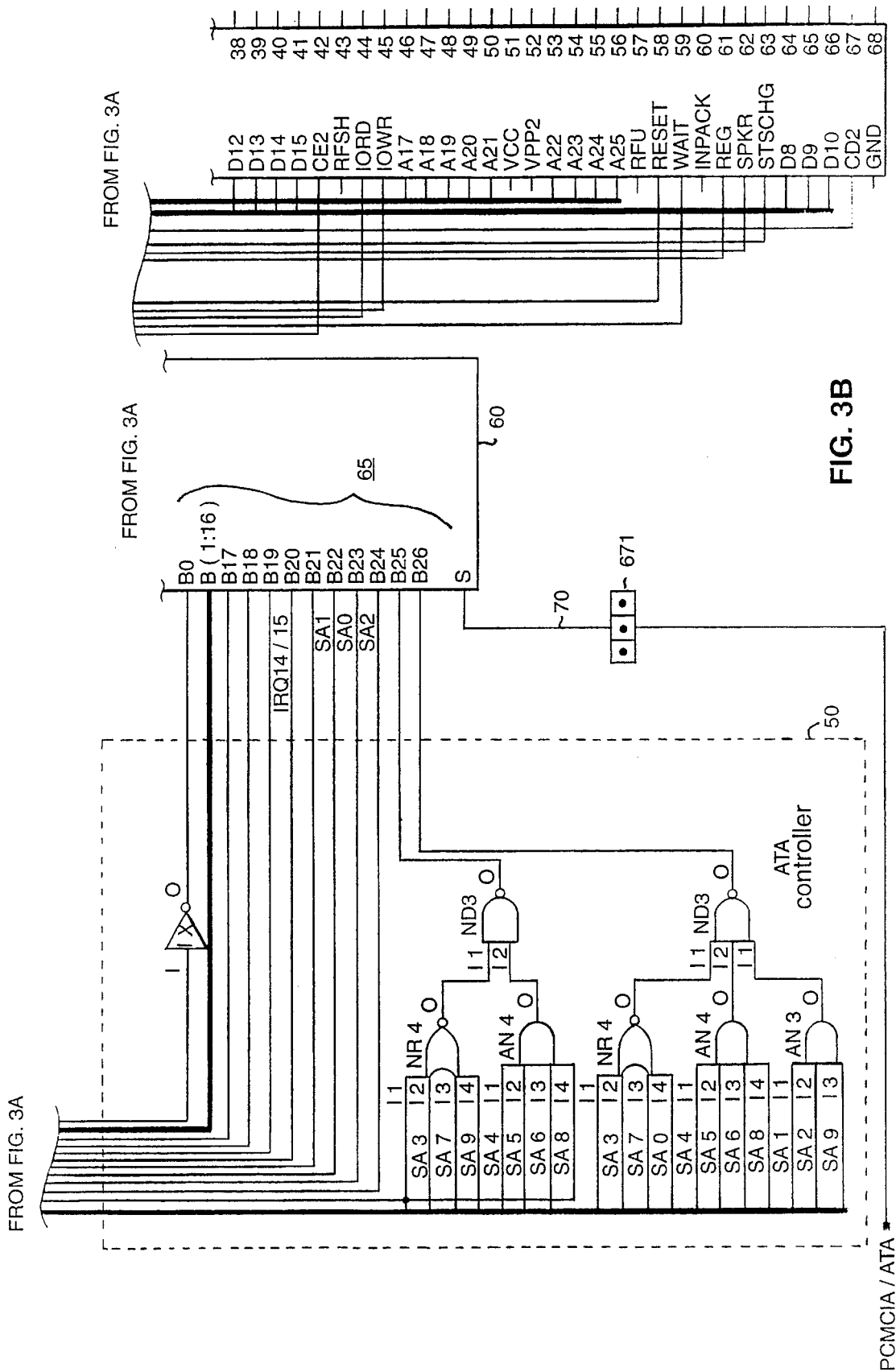
Figure 4A:
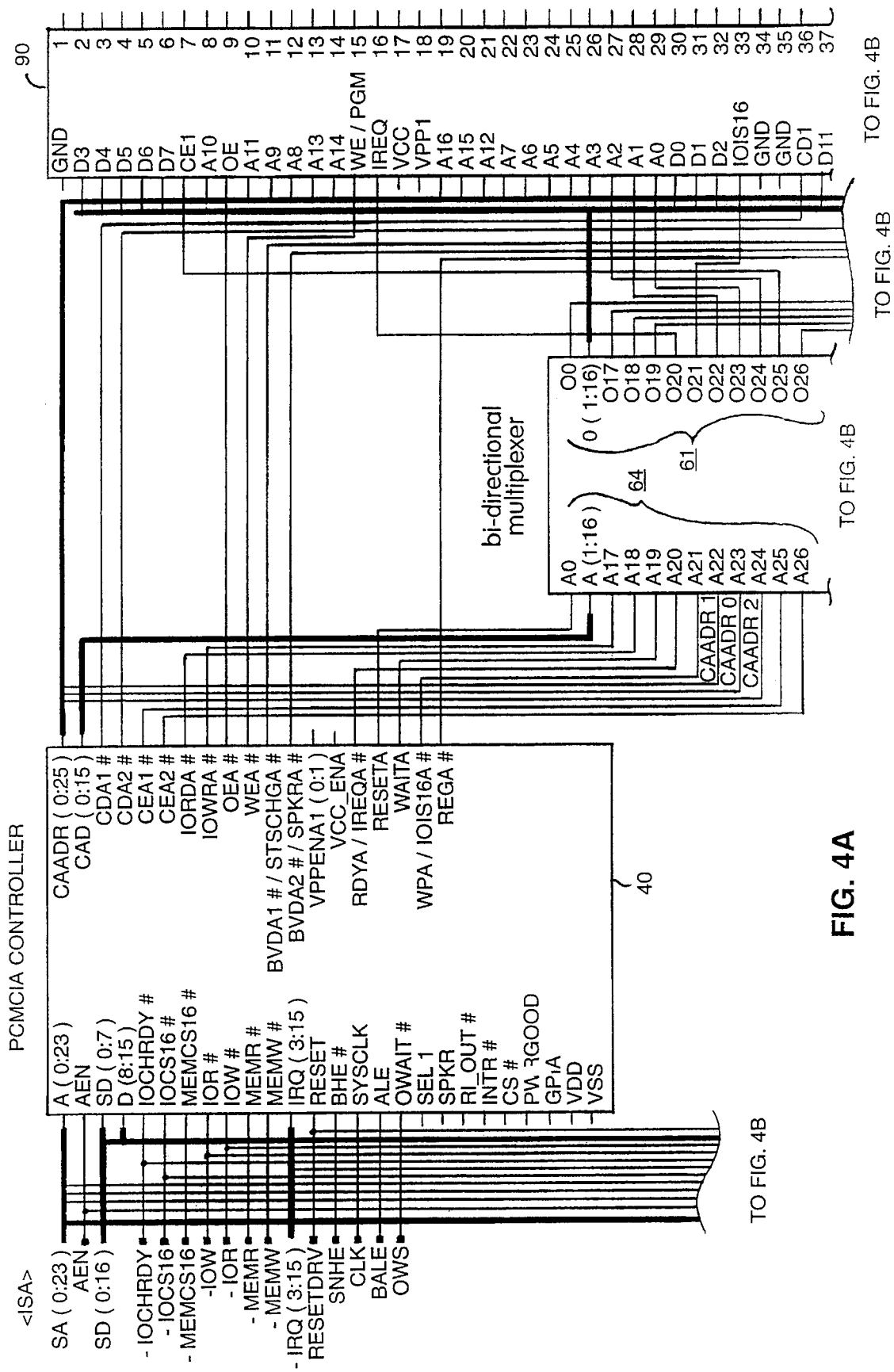
FIGS. 4A and 4B show schematic diagrams of another preferred embodiment of the controlling apparatus of the present invention that interfaces between the PCMCIA and the ISA buses.
Figure 4B:
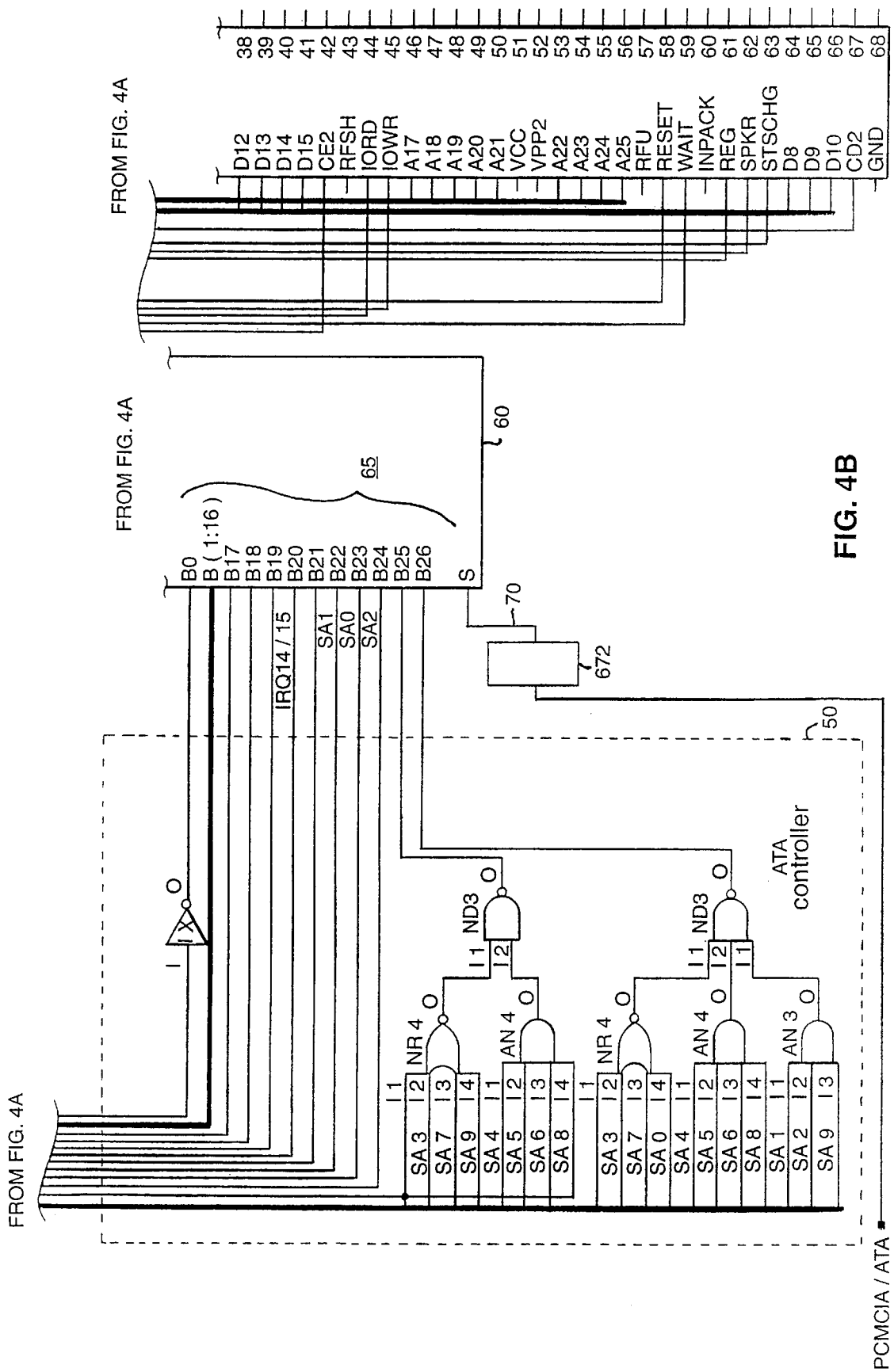

Selection circuit 67 can be a simple jumper 671 as shown in FIGS. 3A and 3B, or a digital buffer 672 as shown in FIGS. 4A and 4B, which controls whether dual interface apparatus 100 is set to function as a PCMCIA interface or as an ATA interface by providing a signal on line 70. In the case of a mechanical jumper 671, the selection can be set manually. In the case of digital buffer 672, the selection can be made under program control. For example, the selection can then be controlled as a part of the BIOS set up routine commonly used in computers. Thus, the PCMCIA/ATA dual interface apparatus 100 can be selected to function either as a PCMCIA or an ATA interface in accordance with the requirements of the host notebook computer in which the interface 100 is used.

Referring now to FIGS. 3A and 3B, these figures are schematic diagrams of a preferred embodiment of the control apparatus of the present invention. As mentioned above, the PCMCIA/ATA dual interface apparatus 100 can comprise a PCMCIA controller 40, an ATA controller 50, and a multiplexer means 60. In this exemplified schematic diagram, the PCMCIA controller 40 may comprise a single-chip IC that implements the PCMCIA interface for the computer system. The PCMCIA IC is connected to the necessary signals in the ISA bus of the computer, as is indicated in the drawing. These signals include address and data bits, I/O read/write, memory read/write, as well as other ISA bus control signals. As persons skilled in this art can appreciate, the PCMCIA interface is itself an interface built basically on the ISA bus of an IBM-compatible computer system.

It should be noted that the PCMCIA controller 40 is an optional component in the present invention, for example, it can be UM 8365 produced by United Microelectronics Corporation of Taiwan or 82365SL produced by Intel Corporation, etc.. Besides, the multiplexer means 60 is a bi-directional multiplexer which can be an ASIC (Application Specific Integrated Circuit). On the other hand, as is well known to persons skilled in this art, ATA controller 50 is basically required to implement a decoder of the designated I/O ports on the I/O address space of an IBM-compatible computer system. Those designated I/O ports can be easily decoded by a series of logic gates arrangement as shown in the drawing.

For the two sets of functional subsystems in PCMCIA/ATA dual interface apparatus 100 of the present invention, namely the PCMCIA and the ATA controllers 40 and 50, a multiplexer means 60, specifically a 2-to-1 bi-directional multiplexer is provided to allow for the apparatus 100 to function either as the PCMCIA or the ATA interface as selected by the selection circuit 67 as shown in FIG. 2 and described above. The multiplexer 60 is bi-directional since many of the signals which are multiplexed are bi-directional signals. As is seen in the drawing, bi-directional multiplexer 60 has two selection ports, one of them (64) being connected to the PCMCIA set of electrical signals, while the other (65) being connected to the ATA set of electrical signals.

The selected output of the bi-directional multiplexer means 60 is connected to the PCMCIA bus connector of the notebook computer. In this exemplified embodiment of the present invention, the PCMCIA/ATA dual interface apparatus is primarily set up as a PCMCIA interface, and has a PCMCIA connector 90 provided for the direct hook up with standard PCMCIA peripheral devices provided for notebook computer system. When dual interface apparatus 100 is set to perform as the ATA interface, a connection interchanging adapter (not shown) can be utilized to provide for mechanical compatibility of dual interface apparatus 100 to the typical ATA interface found in the marketplace. For example, a 68-pin-to-40-pin interchanging adapter 90 can be used to physically convert the 68-pin PCMCIA bus connector into a 40-pin ATA connector.

Table 1 set forth below lists the cross reference table that indicates the assignment of the 68/40-pin interchange relationship. When a 68-to-40-pin conversion adapter based on this listed pin-exchange assignment is connected to the PCMCIA connector 90, and the selection circuit 67 is set to control dual interface apparatus 100 to perform as an ATA interface, the conversion adapter then provides the ATA interface needed for the connection of the hard disk and/or CD-ROM drives to the notebook computer via its PCMCIA slot.

Having described the invention in connection with a preferred embodiment thereof, modification will now suggest itself to those skilled in the art. Thus, the invention is not to be limited to the disclosed embodiment except as required by the appended claims.

TABLE 1

| PCMCIA Interface | | ATA Interface | |
|---|---|---|---|
| Pin No. | Pin Name | Pin No. | Pin Name |
| 1 | GND | 2 | Gound |
| 2 | D3 | 11 | DD3 |
| 3 | D4 | 9 | DD4 |
| 4 | D5 | 7 | DD5 |
| 5 | D6 | 5 | DD6 |
| 6 | D7 | 3 | DD7 |
| 7 | CE1 | 37 | CS1FX.# |
| . | . | . | . |
| . | . | . | . |
| . | . | . | . |
| 16 | IREQ | 31 | INTRQ |
| . | . | . | . |
| . | . | . | . |
| . | . | . | . |
| 27 | A2 | 36 | DA2 |
| 28 | A1 | 33 | DA1 |
| 29 | A0 | 35 | DA0 |
| 30 | D0 | 17 | DD0 |
| 31 | D1 | 15 | DD1 |
| 32 | D2 | 13 | DD2 |
| 33 | IOCS16 | 32 | IOCS16# |
| 34 | GND | 19, 22 | Ground |
| 35 | GND | 24, 26 | Ground |
| . | . | . | . |
| . | . | . | . |
| 37 | D11 | 10 | DD11 |
| 38 | D12 | 12 | DD12 |
| 39 | D13 | 14 | DD13 |
| 40 | D14 | 16 | DD14 |
| 41 | D15 | 18 | DD15 |
| 42 | CE2 | 38 | CS3FX# |
| . | . | . | . |
| . | . | . | . |
| 44 | IORD | 25 | DIOR# |
| 45 | IOWR | 23 | DIOW# |
| . | . | . | . |
| . | . | . | . |
| 58 | RESET | 1 | RESET# |
| 59 | WAIT | 27 | IORDY |
| 60 | INPACK | 21 | DMARQ |
| 61 | REG | 29 | DMACK# |
| . | . | . | . |
| . | . | . | . |
| 64 | D8 | 4 | DD8 |
| 65 | D9 | 6 | DD9 |
| 66 | D10 | 8 | DD10 |
| . | . | . | . |
| . | . | . | . |
| 68 | GND | 30, 40 | Ground |

I claim:

1. A method for controlling a hard disk and/or CD-ROM drives through a PCMCIA interface of a computer system comprising the steps of:

generating of a set of Advanced Technology Attachment (ATA) interface electronic signals in a PCMCIA/ATA dual interface of said computer system; and providing a selection signal for said PCMCIA/ATA dual interface, said selection signal selecting either a set of the PCMCIA interface electronic signals or said set of ATA interface electronic signals to connect to a connector of said PCMCIA interface of said computer system.

2. The method for controlling a hard disk and/or CD-ROM drives through the PCMCIA interface of claim 1, wherein the PCMCIA interface electronic signals are provided by said PCMCIA interface and said ATA interface electronic signals are multiplexed by a multiplexer means to provide either the PCMCIA or the ATA interface for said computer system.

3. The method for controlling a hard disk and/or CD-ROM drives through the PCMCIA interface of claim 2, said selection signal is selected by a jumper.

4. The method for controlling a hard disk and/or CD-ROM drives through the PCMCIA interface of claim 2, wherein provision of the PCMCIA or ATA interface is selected by a software-controlled digital buffer.

5. The method for controlling a hard disk and/or CD-ROM drives through the PCMCIA interface of claim 1, wherein said multiplexer means is a bi-directional multiplexer.

6. The method for controlling a hard disk and/or CD-ROM drives through the PCMCIA interface of claim 5, wherein provision of the PCMCIA or ATA interface is selected by a jumper.

7. The method for controlling a hard disk and/or CD-ROM drives through the PCMCIA interface of claim 5, wherein provision of the PCMCIA or ATA interface is selected by a software-controlled digital buffer.

8. An apparatus for controlling a hard disk and/or CD-ROM drives through a PCMCIA interface of a computer system comprising:

a PCMCIA controller connected to an Industry Standard Architecture (ISA) bus of said computer system for implementing PCMCIA interface functions;

an Advanced Technology Attachment (ATA) controller connected to the ISA bus of said computer system for implementing ATA interface functions; and a multiplexer means connected both to said PCMCIA controller and to said ATA controller, said multiplexer means being responsive to a selection signal provided from a selection means, whereby said apparatus performs either the PCMCIA or the ATA interface functions under control of said selection signal.

9. The apparatus for controlling a hard disk and/or CD-ROM drives through the PCMCIA interface of claim 8, wherein said multiplexer means is a 2-to-1 bi-directional multiplexer.

10. The apparatus for controlling a hard disk and/or CD-ROM drives through the PCMCIA interface of claim 9, wherein said selection means is an open-short jumper.

11. The apparatus for controlling a hard disk and/or CD-ROM drives through the PCMCIA interface of claim 9, wherein said selection means is a software-controlled digital buffer.

12. The apparatus for controlling a hard disk and/or CD-ROM drives through the PCMCIA interface of claim 8, wherein said selection means is an open-short jumper.

13. The apparatus for controlling a hard disk and/or CD-ROM drives through the PCMCIA interface of claim 8, wherein said selection means is a software-controlled digital buffer.

* * * * *